(No Model.)

G. U. MEYER.
SEAMLESS PLATED WIRE.

No. 445,814. Patented Feb. 3, 1891.

WITNESSES:
Chas. H. Luttin Jr.
M. F. Bligh

INVENTOR:
George U. Meyer
by Joseph A. Miller & Co.
Attys

UNITED STATES PATENT OFFICE.

GEORGE U. MEYER, OF PROVIDENCE, RHODE ISLAND.

SEAMLESS PLATED WIRE.

SPECIFICATION forming part of Letters Patent No. 445,814, dated February 3, 1891.

Application filed July 1, 1890. Serial No. 357,357. (No specimens.)

*To all whom it may concern:*

Be it known that I, GEORGE U. MEYER, of Providence, in the county of Providence and State of Rhode Island, have invented a new and useful Improvement in Ingots for Seamless Plated Wire; and I hereby declare that the following is a full, clear, and exact description of the same, reference being had to the accompanying drawings, forming part of this specification.

This invention has reference to an improvement in the art of making seamless plated wire for jewelers' use; and it consists in the peculiar and novel method for securing the core to the plating-tube, metal to metal, before fusing the solder, as will be more fully set forth hereinafter.

In forming ingots for seamless plated wire a seamless tube or shell of precious metal or a shell formed of inferior metal plated on the outside with precious metal is secured to the core by solder interposed between the core and the seamless tube or shell and the tube or shell is united to the core by fusing the solder in a furnace. As the so-formed ingots have to be drawn or rolled out lengthwise into wire or plates, it is important to use as little solder in the ingot as possible, and also to interpose the solder uniformly of even thickness between the core and the shell.

The object of my invention is to secure these results by the cheap and certain step in the process of firmly drawing or rolling the shell onto the solder-covered core, metal to metal, so that when the solder is fused the liquid solder can not flow from one part of the ingot to another, and thus produce unequal distribution of the solder.

Figure 1:
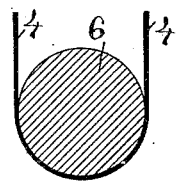
Figure 2:
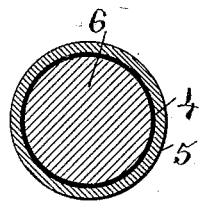
Figure 3:
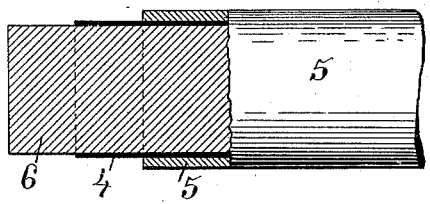

Figure 1 is a cross-section of a bar of metal partly inclosed in a sheet of solder. Fig. 2 is a cross-section of a rod or core of metal covered with a sheet of solder and a tube of plating metal. Fig. 3 is a longitudinal view, partly in section, of a bar or core of metal covered with solder and inserted in a tube of precious or plating metal.

In the drawings, the number 5 indicates a seamless tube of precious or other plating metal; 4, a strip of solder, and 6 the rod forming the core.

In carrying out my invention I take a seamless tube 5 of precious metal or an alloy of metals adapted for plating inferior metal, and prepare a rod or core 6 of inferior metal of a diameter less than the interior diameter of the tube. After cleaning this core 6 and covering the surface of the same with borax or other flux I form around the core a sheet of solder 4, previously rolled out to the desired thickness and cut to the width required to cover the core. I now thoroughly clean the interior of the tube 5, cover the same with borax or other flux and insert the solder-covered core 6 into the tube. The relative diameters are such that the tube 5 can be readily drawn over the solder 4 of the core 6. I now draw the tube 5 down firmly onto the solder by passing the combined core, solder, and tube through one or more holes in a drawplate or between suitable rollers, and when the tube has been drawn close to the core, metal to metal, I subject the so-prepared rod or ingot to heat sufficient to melt the solder, and thus firmly secure every part of the interior surface of the tube to the core. The so-prepared rod or ingot may now be drawn or rolled into wire, rolled into a strip or plate and used for all purposes for which seamless plated wire is used, and in the same manner. A tube may be used in place of the rod 6 to form the core, and plated seamless tubular wire may be drawn from an ingot in which a tube is used for the core.

Having thus described my invention, I claim as new and desire to secure by Letters Patent—

The herein-described process of making ingots for seamless wire, the same consisting in bending and drawing around the prepared core a sheet of solder, inserting the solder-covered core into a prepared tube of plating metal, forcing the plating-tube into close contact with the solder-covered core by contracting the diameter of the tube, and then subjecting the so-formed ingot to heat to melt the solder to unite the tube to the core, as described.

GEORGE U. MEYER.

Witnesses:
   J. A. MILLER, Jr.,
   M. F. BLIGH.